UNITED STATES PATENT OFFICE.

THOMAS E. PHILLIPS, OF BLOOMINGTON, INDIANA, ASSIGNOR OF ONE-HALF TO FRED MATTHEWS, OF SAME PLACE.

PROCESS OF FORMING PAPER-PULP FROM CANE-BRAKE CANE.

SPECIFICATION forming part of Letters Patent No. 659,490, dated October 9, 1900.

Application filed August 13, 1898. Serial No. 688,512. (No specimens.)

*To all whom it may concern:*

Be it known that I, THOMAS E. PHILLIPS, a citizen of the United States, residing at Bloomington, Indiana, have invented certain new and useful Improvements in Processes of Manufacturing Paper-Pulp, of which the following is a specification.

The object of my invention is to take the cane of cane-brakes—the wild cane—and by subjecting it to certain manipulations and operations convert it into paper-pulp stock for the manufacture of paper; and my invention consists in the process or mode of treatment by which such conversion is effected, as well as in the finished product itself, as will be hereinafter fully described and claimed.

As my process or mode of treatment is independent of the special mechanical means by which it is carried out or effected, I do not deem it necessary to illustrate or describe in detail such mechanical means, but rather the process and mode of operation by which I secure the desired results.

In carrying out and effecting my process or mode of operation in the manufacture of paper-pulp from the wild cane I take the cane in its green state and preferably just as it is cut from the cane-brake and thoroughly bruise or mash it throughout its length, so as to destroy as far as practicable the joints in it. This bruising or mashing may be effected in any desired way, but preferably by passing the green stalks of cane through sets of rolls placed near enough together to flatten the stalks in their passage through them and so destroy or break up the solid substance composing the joints. After the green cane-stalks have been subjected to a bruising or mashing operation, so as to secure the above results, they are next cut into pieces or sections of any desired length to expose the material composing them in cross-section. For ordinary purposes I prefer to cut them into short sections—say, from a quarter to half an inch in length—although they may be cut into sections of any desired length, depending upon the length of fiber that it is desired to secure in the finished product. This cutting, like the bruising or mashing, may be effected by any desired suitable mechanism operated either by hand or by power, though for large quantities it is obvious that power-operated machinery should be employed. The only requisite of such machinery, however, is its capacity to cut the stalks into the desired lengths and with the desired degree of rapidity. After the stalks have been bruised or mashed and cut into sections or lengths, as above explained, they are subjected to the action of water, in which they are submerged and which preferably slowly flows or moves through and past them. This operation may be carried out by placing the cut material into vats or tanks of any desired size, which are supplied with the requisite quantity of water. The size of the vats or tanks will of course be proportionate to the quantity of material intended to be subjected to the treatment and action of water or, in other words, proportionate to the amount of work carried on. For large operations tanks or vats capable of containing hundreds or even thousands of tons may be employed, so that the material can be kept stored in them until it is desirable to remove it for further operations. The material being subjected to the action of water should be entirely submerged, so as to be protected from the action of the air on it, which otherwise, in connection with the moisture, would cause mildew or other deleterious action. The material should remain in the water a considerable time, though there is a very wide latitude of choice in this particular. I have found that after ten days or two weeks the material would be in condition for the next step or operation in my process, particularly when it has been cut into short sections, although I prefer that it should remain much longer. I have likewise found that if the material is kept submerged it may remain in the water for perhaps a year and a half without being spoiled or rendered unfit for use. As the principal object of this treatment to the action of water is to loosen and remove the gluten and solid particles which, with the fiber, compose the cane-stalk it is in my opinion better to keep the material submerged for, say, a month before subjecting it to the next step or operation. Inspection of the material from time to time will readily show when it has reached such a point of softening or disintegration as will release the fibers from the gluten or solid particles, and thus show when the next step or operation should be taken. When the material has reached the proper stage, as above explained, it is subjected to a masticating or grinding operation by which it is thoroughly disintegrated and torn to pieces, so that the fiber and the glutinous matter are completely separated from each other. This grinding or mastication may be effected by any desired suitable mechanical means adapted to tear and separate the particles, so that the fiber may be recovered from the glutinous particles with which it is originally connected. This grinding or mastication should take place in the presence of water, so that the separation of the particles may be readily effected. The fibers which it is desired to save are lighter than the glutinous material or particles, so that they float on the water, while such particles sink. After the material has been sufficiently torn to pieces, disintegrated, and washed, so that the fibrous portion has been separated from the glutinous and undesirable portion, the fibers are passed or conveyed to bleaching digesters or tanks, where they are subjected to a bleaching operation in any desired bleaching liquid. I prefer to use a liquid composed of water and chlorid of lime. This solution may be made of different degrees of strength, as preferred by the operator. I prefer, however, to make the solution strong, so that the bleaching operation will only occupy from, say, twenty minutes to half an hour. After the fibers have been bleached to the desired degree of whiteness—any shade from its original color to a perfect whiteness—I subject the fibers to a washing process in clean water, which frees them from the bleaching solution. After this I subject them to pressure in desired quantities, so as to form solid masses, as bricks, blocks, or bales of any desired size, which shall be hard and of a form easy and convenient to handle and ship. The moisture is to a large extent pressed out of the fiber in the operation of squeezing it into masses, so that the finished product contains only a small percentage of moisture. The material is now in condition to be shipped to paper-mills to be converted into paper of any desired kind by subjecting it to the processes employed at paper-mills for such purposes and I need not further describe its manipulation.

What I regard as new, and desire to secure by Letters Patent, is—

The process of forming paper-pulp from cane-brake stalks, which consists in bruising or mashing the stalks, when in a green state, to break up the solid substance composing the joints, cutting the bruised or mashed stalks into short lengths, subjecting the bruised or mashed and cut stalks to the action of water at its normal temperature for a period of ten days or over to secure thorough disintegration of the fibrous from the glutinous and solid particles, grinding or masticating the disintegrated material and separating the fiber from the glutinous and solid particles, substantially as described.

THOMAS E. PHILLIPS.

Witnesses:
 THOMAS A. BANNING,
 SAML. W. BANNING.